US012748508B2

(12) United States Patent
Choi et al.

(10) Patent No.: US 12,748,508 B2
(45) Date of Patent: Sep. 29, 2026

(54) METHOD AND DEVICE FOR SIGNAL PROCESSING OF TOUCH PANEL WITH EVENT DETECTOR FOR SPARSE SIGNAL DETECTION

(71) Applicant: SEOUL NATIONAL UNIVERSITY R&DB FOUNDATION, Seoul (KR)

(72) Inventors: Woo Seok Choi, Seoul (KR); Hyeri Roh, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 19/306,391

(22) Filed: Aug. 21, 2025

(65) Prior Publication Data

US 2026/0056631 A1 Feb. 26, 2026

(30) Foreign Application Priority Data

Aug. 23, 2024 (KR) ........................ 10-2024-0113359

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC ..... G06F 3/04166; G06F 3/044; G06F 3/0446
See application file for complete search history.

(56) References Cited

U.S. PATENT DOCUMENTS 8,692,801 B2 4/2014 Luo et al.
8,928,635 B2 * 1/2015 Harley .................. G06F 3/0446 345/173
8,988,390 B1 * 3/2015 Krah ................... G06F 3/04166 345/174

(Continued)

FOREIGN PATENT DOCUMENTS

KR 10-1615813 B1 5/2016
KR 10-2016-0150254 A 12/2016

(Continued)

OTHER PUBLICATIONS

D. L. Donoho, "Compressed sensing," IEEE Transactions on Information Theory, vol. 52, No. 4, pp. 1289-1306, Apr. 2006, USA.

(Continued)

*Primary Examiner* — Benyam Ketema
(74) *Attorney, Agent, or Firm* — Bridgeway IP Law Group, PLLC; Jihun Kim

(57) ABSTRACT

A signal processing apparatus for a touch input device is described. The apparatus includes: a plurality of drive channels arranged in an input area for a touch function; a plurality of sensor channels arranged to intersect the drive channels and configured to detect a change in capacitance of the input area according to a driving signal applied to the drive channels; and a readout IC configured to apply the driving signal to the drive channels and receive detection results from the sensor channels. The readout IC includes: an event detector configured to detect an event region and to enable a second driving signal; and a signal converter configured to measure a capacitance signal, convert the signal into a digital signal, and output the digital signal.

18 Claims, 8 Drawing Sheets

(56) References Cited

U.S. PATENT DOCUMENTS

| | | | | |
|---|---|---|---|---|
| 2012/0013563 | A1* | 1/2012 | Chou | G06F 3/044 345/174 |
| 2012/0019467 | A1* | 1/2012 | Hotelling | G06F 3/0445 345/173 |
| 2014/0111465 | A1* | 4/2014 | Shih | G06F 3/0418 345/174 |
| 2014/0267086 | A1* | 9/2014 | Yousefpor | G06F 3/0448 345/173 |
| 2014/0267087 | A1* | 9/2014 | Yousefpor | G06F 3/04166 345/173 |
| 2015/0145822 | A1* | 5/2015 | Katsuta | G06F 3/04184 345/174 |
| 2015/0324059 | A1* | 11/2015 | Lee | G06F 3/0443 345/174 |
| 2016/0313823 | A1* | 10/2016 | Tan | G06F 3/0446 |
| 2016/0357321 | A1* | 12/2016 | Ito | G09G 3/36 |
| 2017/0089995 | A1* | 3/2017 | Basser | G01R 33/448 |
| 2017/0139515 | A1* | 5/2017 | Lee | G06F 3/0412 |
| 2020/0159352 | A1* | 5/2020 | Shimada | G01R 27/2605 |
| 2020/0387249 | A1* | 12/2020 | Shimada | G06F 3/04186 |
| 2023/0367425 | A1* | 11/2023 | Jang | G06F 3/0412 |
| 2024/0069673 | A1* | 2/2024 | Lee | G06F 3/04166 |
| 2026/0056631 | A1* | 2/2026 | Choi | G06F 3/04166 |

FOREIGN PATENT DOCUMENTS

| | | | | | |
|---|---|---|---|---|---|
| KR | 10-2171623 | B1 | | 10/2020 | |
| KR | 102186177 | B1 | * | 12/2020 | G06F 3/044 |
| KR | 10-2022-0084971 | A | | 6/2022 | |
| KR | 10-2024-0054232 | A | | 4/2024 | |
| WO | WO-2021172730 | A1 | * | 9/2021 | G06F 3/04186 |

OTHER PUBLICATIONS

Hyeri Roh et al., "A Context-Aware Readout System for Sparse Touch Sensing Array Using Ultra-Low-Power Always-On Event Detection," IEEE Transactions on Circuits and Systems II: Express Briefs, vol. 70, No. 9, pp. 3719-3723, Sep. 2023, USA.

* cited by examiner

METHOD AND DEVICE FOR SIGNAL PROCESSING OF TOUCH PANEL WITH EVENT DETECTOR FOR SPARSE SIGNAL DETECTION

CROSS-REFERENCE TO RELATED APPLICATION

This application claims the benefit under 35 USC 119(a) of Korean Patent Application No. 10-2024-0113359 filed on Aug. 23, 2024 in the Korean Intellectual Property Office, the entire disclosure of which is incorporated herein by reference for all purposes.

BACKGROUND

Field

The present invention relates to the field of touch signal detection technology, and more particularly, to a method and a device for signal processing of a touch input device based on detection of touch events using sparse signals

Description of the Related Art

Today's user interfaces (UI) have evolved from electronic input devices such as keyboards and mice to touch input devices that allow users to directly touch a desired object using a hand or a pen. Among them, a representative example is a touch screen panel (TSP), which is widely used in various products such as smartphones, tablets, and TVs.

Various types of touch methods may be applied to a touch screen panel, such as resistive, capacitive, electromagnetic induction, infrared, or ultrasonic methods. Among them, capacitive-type touch screen panels have become mainstream due to their stable operation under temperature variations and high detection accuracy, and the demand for them continues to increase.

In a capacitive-type touch screen panel, for example, touch presence and touch position can be detected based on changes in capacitance caused by an input tool such as a user's finger or an electronic pen contacting or approaching sensors arranged on the touch screen.

FIG. 1 is a diagram illustrating a signal processing circuit of a conventional touch screen panel. Referring to FIG. 1, a touch screen is generally configured such that multiple drive channels (Drv[1]-Drv[n]) and sensor channels (sen.[1]-sen.[y]) intersect with each other. Touch information input by a user is recognized by reading changes in mutual capacitance (CM), which is a parasitic capacitance between the drive and sensor channels. That is, a driver applies driving signals—also called excitation signals—to each drive channel to measure the CM, and the CM at the touched location changes. The difference in CM modulated by the driving signals is transmitted to a readout integrated circuit (Readout IC) through the sensor channels. The signals input to the Readout IC are amplified, converted into digital signals, and sent to a digital signal processor (DSP), where the embedded information is decoded.

Here, since the signal path detected at each column of the touch screen is read by the readout IC as CM modulated by the driving signals, the values measured by the ADC can be expressed by the following equation.

$$y_i = \Phi x_i + n \qquad \text{[Equation 1]}$$

$\Phi$ denotes a matrix that implements the driving signals, xi represents the mutual capacitance of the i-th column, and n denotes random circuit noise.

As described above, the main components of the readout integrated circuit (Readout IC) are a charge amplifier (Amp), an analog-to-digital converter (ADC), and a driver. The power consumed by these components can vary with performance metrics such as frame rate and signal-to-noise ratio (SNR).

Although each component can be designed to minimize its own power consumption while meeting the required performance, there is an inherent trade-off between frame rate or SNR and power. A higher frame rate and SNR yield more accurate detection results but inevitably cause greater power consumption.

Accordingly, despite significant advances in high-density circuit design technologies, the sector has yet to fully satisfy market demand for larger touch screen panels, whose sensors and readout circuits consume additional power. This issue is particularly acute in systems such as mobile devices, where stringent energy constraints apply as panel size increases.

More specifically, conventional touch screen panels must activate all system elements to detect sparsely occurring signals across the entire sensing area, even though valid information is not provided by the touch sensors during most of the product's operating time. Continuous yet unnecessary data conversions and transmissions therefore waste a substantial amount of energy.

Against this backdrop, various sensing techniques have been developed to read data from touch-sensor arrays. FIGS. 2A through 2C illustrate representative types of such sensing techniques.

FIG. 2A illustrates a time division multiplexed sensing (TDM) method. In this method, an identity matrix $\Phi_{TDM}$ of size n×n is used to sequentially deliver driving signals to each drive channel. Accordingly, the following equation holds, and since the modulated signals do not require subsequent demodulation, implementation is relatively simple.

$$\hat{x}_i = y_i \qquad \text{[Equation 2]}$$

However, in the TDM method, all sensors in each column must perform sensing operations, resulting in considerable power consumption. In particular, the energy efficiency of TDM deteriorates significantly as the number of sensors configured in the touch screen increases. For example, if the number of sensors doubles while the frame rate remains fixed, the power consumption of the readout integrated circuit more than doubles in order to read the sensors at twice the bandwidth while maintaining the same SNR. Therefore, it becomes infeasible to accommodate the total energy consumption of TDM in products that require larger touch screen sizes or higher frame rates.

FIG. 2B illustrates a code division multiplexed sensing (CDM) method. In this method, the applied driving signals form an n×n orthogonal matrix $\Phi_{CDM}$. Since the matrix is orthogonal, and thus its transpose is its inverse, the signal detected through the sensor channels can be reconstructed using the following equation.

$$\hat{x}_i = \Phi_{CDM}^{\top} y_i \qquad \text{[Equation 3]}$$

In particular, when the elements of $\Phi_{CDM}$ consist of −1, 0, and 1, it is relatively easy to implement the matrix in hardware. For example, a Hadamard matrix can be used. As such, CDM offers the advantage of reducing noise during the signal recovery stage and achieving a higher SNR when the noise is uniformly distributed.

However, like TDM, CDM also requires sensing operations proportional to the number of sensors configured in the touch screen, resulting in increased power consumption by the amplifier and ADC in the readout integrated circuit. In addition, as shown in FIG. 2B, the driver must continue switching driving signals throughout the sensing period, which significantly increases drive operation power. Furthermore, as the size of the touch screen increases, CDM suffers from increased parasitic capacitance on the drive channels, leading to degraded energy efficiency when applied to large-scale touch screens.

To address the aforementioned issues of TDM and CDM, a compressed sensing (CS) approach, illustrated in FIG. 2C, has been introduced. CS is adopted to read sparse signals from sensor channels, leveraging the characteristic that touch events occur only partially in terms of location or time. Unlike TDM, CS applies driving signals randomly to each drive channel using a rectangular matrix $\Phi_{CS}$ of size m×n (where m<n). In other words, CS uses a matrix $\Phi_{CS}$ composed of randomly combined elements of −1, 0, 1 or −1, 1, allowing multiple rows to be sensed simultaneously when a partial touch event occurs. As a result, CS reduces the number of sensing operations per unit time compared to TDM and CDM, thereby achieving faster processing speed and lower energy consumption in the readout integrated circuit.

However, since $\Phi_{CS}$ is a rectangular matrix with m<n, the reconstruction of signals modulated by capacitance differences requires extremely complex computations. That is, CS collects multiple mixed signals at once, and subsequent recovery necessitates computationally intensive signal recovery algorithms, with significant time and energy required to minimize theoretical errors. Accordingly, even if CS saves power in the readout integrated circuit, the power consumed for signal reconstruction negates any overall energy efficiency benefit in the system.

In fact, CS is practically viable only in high-performance computing environments. Especially for touch screen panels used in mobile devices, energy efficiency is required not only during signal detection but also during signal recovery. Therefore, CS is even more unsuitable for such applications, and its commercialization remains infeasible.

Thus, there is a growing demand for new methods to overcome the limitations of the conventional techniques. In particular, as mobile devices become more widespread, energy efficiency has become a top priority in the market, and new technologies are needed to achieve excellent energy performance in response to the trend toward larger touch screens.

PRIOR ART DOCUMENTS

Non-Patent Literature (Non-Patent Literature 1) D. L. Donoho, "Compressed sensing," IEEE Transactions on Information Theory, vol. 52, no. 4, pp. 1289-136 April 2006.

SUMMARY

The present invention is intended to solve the problems of the conventional technologies described above, and provides a method and a device for signal processing of a touch input device, wherein touch activity is first detected in a touch input area based on compressed sensing, and time division multiplexed sensing is applied only to the event area where activity is detected.

However, the technical problem to be achieved by the present embodiment is not limited to the aforementioned problems, and other technical problems may also exist.

According to one embodiment of the present invention, a signal processing device for a touch input device includes: a plurality of drive channels arranged in an input area having a touch function; a plurality of sensor channels arranged to intersect with the drive channels and configured to detect a change in capacitance in the input area according to an driving signal applied to the drive channels; and a readout IC configured to apply the driving signal to the drive channels and receive detection results from the sensor channels.

According to one embodiment of the present invention, the readout IC includes: an event detector configured to detect an event area determined as a touch activation within the input area based on detection results from the sensor channels according to a first driving signal based on compressed sensing applied to the drive channels, and configured to apply a second driving signal based on time division multiplexed sensing to the drive channels when the event area is detected; and a signal converter configured to measure a capacitance signal modulated by the second driving signal in correspondence with coordinates recognized as valid touches within the event area, and convert the measured signal into a digital signal and output it.

According to one embodiment of the present invention, the event detector operates continuously with ultra-low power consumption below a preset threshold.

According to one embodiment of the present invention, the signal converter does not operate while the first driving signal is applied to the drive channels and is configured to operate only under the condition that the signal is switched to the second driving signal.

According to another embodiment of the present invention, a signal processing method of a touch input device includes: applying a first driving signal based on compressed sensing to drive channels arranged in the input area having a touch function; detecting changes in capacitance in the input area through sensor channels intersecting the drive channels according to the first driving signal, and detecting an event area determined as a touch activation within the input area based on the detection results; applying a second driving signal based on time division multiplexed sensing to the drive channels in response to the detection of the event area; and detecting a change in capacitance through the sensor channels according to the second driving signal, and measuring a capacitance signal modulated by the second driving signal and converting it into a digital signal in correspondence with coordinates recognized as valid touches within the event area.

According to one embodiment of the present invention, a touch detection technology is provided that prevents unnecessary power consumption and maximizes energy savings.

According to one embodiment of the present invention, a touch detection technology is provided that processes touch signals rapidly.

According to one embodiment of the present invention, a touch detection technology is provided that minimizes the complex reconstruction process of touch signals.

According to one embodiment of the present invention, a touch detection technology is provided that prevents omission and misrecognition of touch events due to undetected signals.

According to one embodiment of the present invention, a touch detection technology is provided that is optimized for large touch screen panels.

The effects of the present invention are not limited to those mentioned above, and other effects not described herein will be clearly understood by those skilled in the art from the following description.

DETAILED DESCRIPTION

Figure 1:
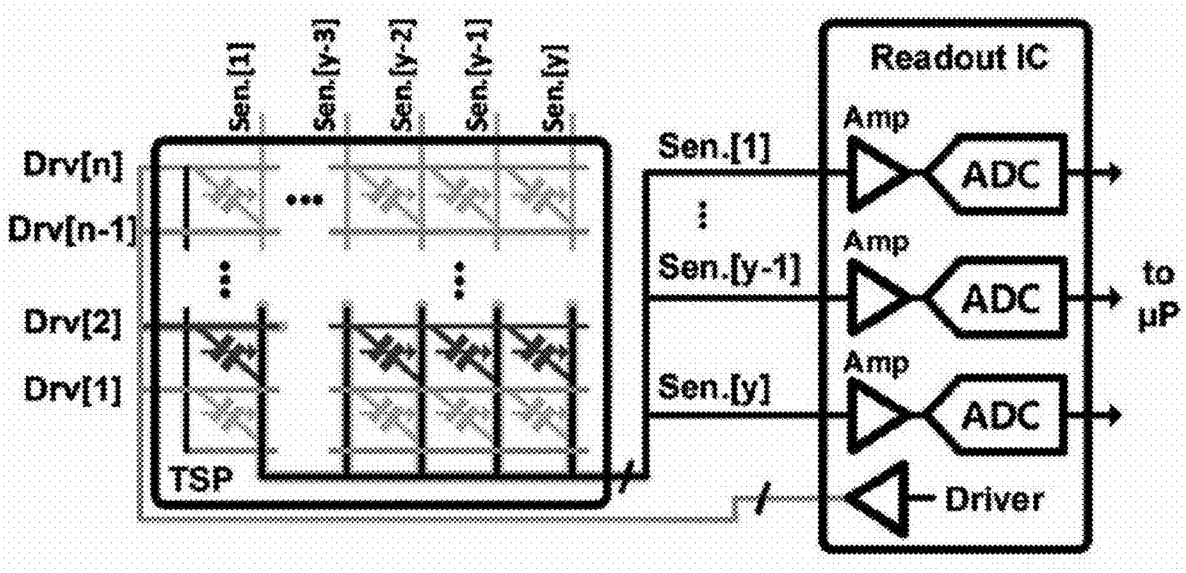
FIG. 1 is a diagram illustrating a signal processing circuit of a conventional touch screen panel.

Hereinafter, embodiments of the present invention will be described in detail with reference to the accompanying drawings so that those skilled in the art can readily implement the invention. However, the present invention may be embodied in various different forms and is not limited to the embodiments described herein. In the drawings, parts irrelevant to the description are omitted to clearly illustrate the present invention, and like reference numerals are assigned to similar elements throughout the specification.

Throughout this specification, when a certain part is described as being "connected" to another part, this includes not only "directly connected" but also "electrically connected" with another element interposed in between. Also, when a component is said to "include" a certain element, unless expressly stated otherwise, it does not exclude other elements but may further include additional elements.

In the present specification, the term "unit" refers to a component implemented by hardware, software, or a combination of both. One unit may be implemented by two or more hardware components, or two or more units may be implemented by a single hardware component. Meanwhile, the suffix "-unit" does not imply a limitation to hardware or software alone; it may be configured to reside in an addressable storage medium or to be executed by one or more processors. Thus, by way of example, a "-unit" may include components such as software modules, object-oriented software components, class components, and task components, as well as processes, functions, attributes, procedures, subroutines, program code segments, drivers, firmware, microcode, circuits, data, databases, data structures, tables, arrays, and variables. The functions provided within the components or "-units" may be combined into fewer components or "-units" or divided into additional components or "-units." Furthermore, the components and "-units" may be implemented to execute on one or more CPUs within a device or secure multimedia card.

In this specification, the term "touch input device" refers to an electronic computing device that provides a data input function using a human finger or an electronic pen. For example, it may include various devices that offer a touch UI such as smartphones, touchpads, laptops, and electronic whiteboards, but is not limited thereto. The embodiments of the present invention will be described primarily with respect to mobile devices that include the most widely used touch screen panel (TSP). However, the embodiments are applicable to various input devices in which sparse signals occur and should be interpreted to encompass such cases.

The term "input area" refers collectively to a region of the touch input device that provides the touch input function. For example, it may include not only the part of the device where a touch screen or touch panel is formed, but also various pointing devices such as touch-type keyboards or touch-type mice, and is not limited thereto. The embodiments of the present invention will be described with a focus on touch screens (TSPs), but equivalent elements should also be interpreted as being within the scope of the invention.

Hereinafter, the embodiments of the present invention will be described in detail with reference to the accompanying drawings.

Figure 3:
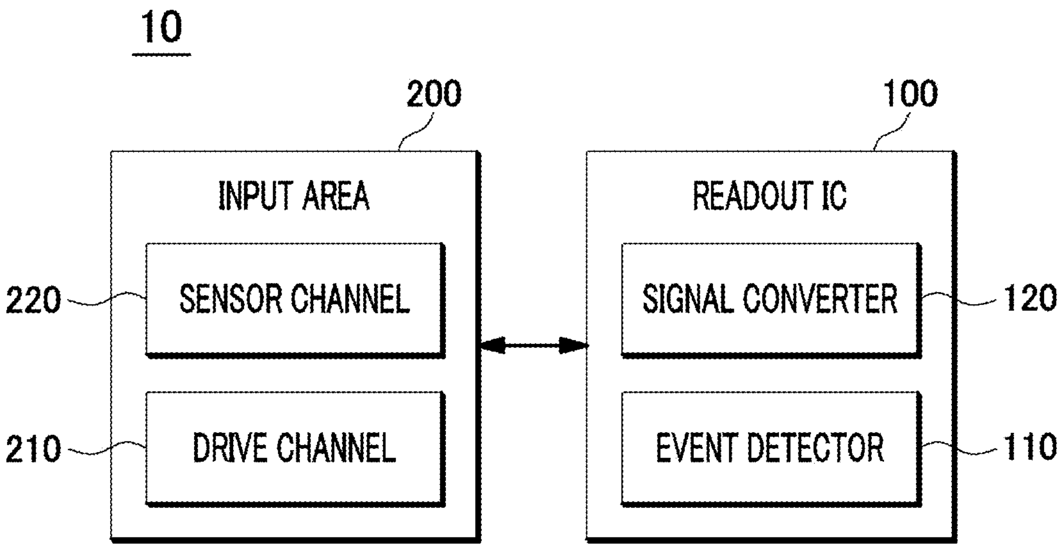
FIG. 3 is a structural diagram of a signal processing device of a touch input device according to one embodiment of the present invention.

FIG. 3 is a structural diagram of a signal processing device for a touch input device according to one embodiment of the present invention. Referring to FIG. 3, the signal processing device 10 includes drive channels (210) and sensor channels (220) arranged in an input area (200), and a readout IC (100).

According to one embodiment, the drive channels (210) may be lines to which driving signals are applied to supply voltage to the input area (200), where pixels are arranged and a touch function is provided. A plurality of drive channels (210) may be arranged in parallel in one direction of the input area (200).

According to one embodiment, the sensor channels (220) are arranged in the input area (200) to intersect the drive channels (210). Accordingly, each intersection point between the drive channels (210) and the sensor channels (220) can be recognized as a coordinate representing a specific position within the input area (200).

When an driving signal is applied, mutual parasitic capacitance is generated between the drive channels (210) and the sensor channels (220). When an input tool such as a finger or a stylus pen touches a specific coordinate within the input area (200), the capacitance at that coordinate changes before and after the touch. The sensor channels (220) detect this change in capacitance, and the modulated signal is transmitted to the readout IC (100).

According to one embodiment, the readout IC (100) applies an driving signal to the drive channels (210) and receives detection results from the sensor channels (220) to read out the corresponding information. When a touch occurs, the readout IC (100) reads the difference in capacitance detected by the sensor channels (220), determines whether a touch event has occurred, and performs digitization to identify valid touches within the corresponding area.

Referring to FIG. 3, the readout IC (100) according to one embodiment includes an event detector (110) and a signal converter (120).

According to one embodiment, the event detector (110) may be configured to detect sparse signals that occur partially in the input area (200) in terms of position or time. That is, the event detector (110) determines whether an event recognized as touch activity has occurred, based on the detection results from the sensor channels (220), and detects a region of interest (ROI) within the input area (200) where a touch event has occurred. Here, the region of interest is defined as the "event area" in terms of meaning.

According to one embodiment, in a standby state where no touch is occurring, the readout IC (100) is configured to apply a first driving signal to the drive channels (210). The event detector (110) receives the changes in capacitance in the input area (200) via the sensor channels (220) in response to the first driving signal, and reads them to detect the event area.

Figure 2A:
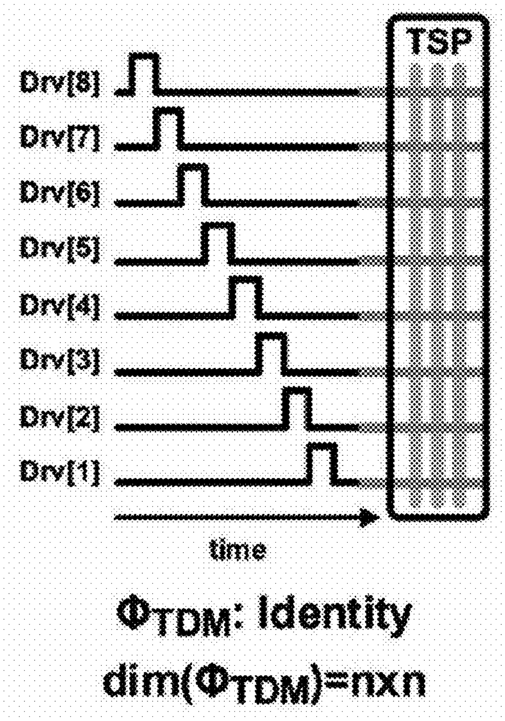
FIGS. 2A, 2B, and 2C are diagrams illustrating representative types of conventional touch sensing techniques.
Figure 2B:
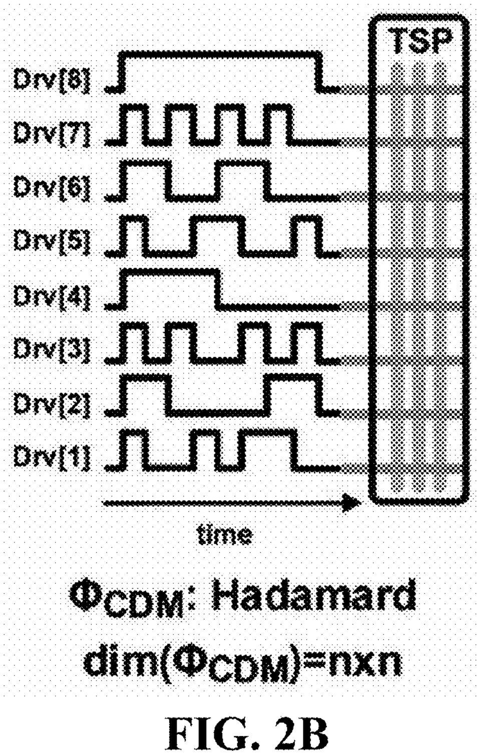
Figure 2C:
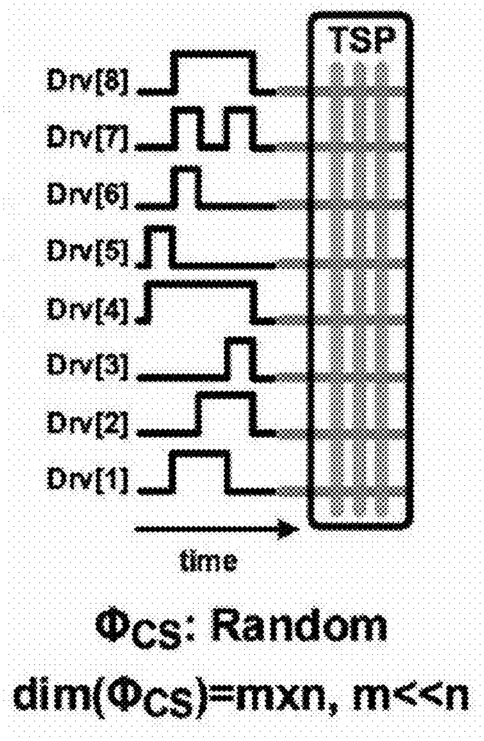

According to one embodiment, it is preferable that the first driving signal be implemented as a voltage waveform for compressed sensing and applied to the drive channels (210). In other words, as previously described with reference to FIG. 2C, the first driving signal may be applied non-sequentially or redundantly to the respective drive channels (210). Therefore, when a partial touch occurs, a single sensor channels (220) can detect signal changes at multiple coordinates at once, resulting in reduced energy consumption by the readout IC (100) and shortened readout time. A more detailed embodiment of the first driving signal will be described later.

According to one embodiment, the event detector (110) may be configured to operate continuously. In other words, the detection of touch activity due to the approach or contact of an input tool, and the identification of the corresponding area, is performed at all times.

According to one embodiment, the event detector (110) may be configured to consume power below a predetermined threshold. The change in capacitance detected by the first driving signal is used only by the event detector (110) and is not processed further to recover touch information through digitization and reconstruction. That is, the event detector (110) does not compute the exact coordinates or embedded information of a valid touch but merely detects whether a sparse signal has occurred and identifies the event area. As a result, the complex computation steps that have been considered a limitation of compressed sensing can be omitted, enabling the event detector (110) to operate continuously with ultra-low power consumption.

According to one embodiment, when the event area is detected by the event detector (110), the readout IC (100) switches from the first driving signal to the second driving signal and applies it to the drive channels (210) in response.

According to one embodiment, the signal converter (120) may be implemented as an analog-to-digital converter (ADC) that converts the analog signal of the capacitance variation caused by the touch into a digital signal for output. That is, the signal converter (120) measures the voltage of the capacitance signal modulated by the second driving signal based on the detection results from the sensor channels (220), thereby enabling accurate detection of the coordinates of valid touches within the event area.

According to one embodiment, the signal converter (120) may be configured to receive only the detection results of the sensor channels corresponding to the event area among the sensor channels (220) arranged in the input area (200) when the second driving signal is applied. Therefore, since touch detection is performed only within the range of the event area rather than the entire input area (200), energy savings can be achieved and processing speed can be improved.

According to one embodiment, the second driving signal is preferably implemented as a waveform for time division multiplexed sensing and applied to the drive channels (210), as it does not require subsequent reconstruction computations. As previously described with reference to FIG. 2A, the second driving signal may be applied sequentially to each drive channel (210). However, since the readout range of the signal converter (120) is limited to the event area, the conventional drawbacks of time division multiplexed sensing—namely excessive energy consumption and long readout times—can be mitigated.

According to one embodiment, the signal converter (120) preferably does not operate while the first driving signal is applied to the drive channels (210), and is configured to operate only under the condition that the signal is switched to the second driving signal. That is, in the standby state where no touch occurs, the signal converter (120) remains OFF and does not consume power. It is only switched ON when touch activity is detected due to the approach or contact of an input tool. Therefore, unlike conventional ADCs that operated continuously even in the absence of valid touches, digital conversion is performed only during necessary periods. This solves the problem of significant energy waste caused by unnecessary operations in the prior art.

Hereinafter, the embodiment of the present invention will be described more specifically with reference to a representative implementation of a touch screen panel (TSP). For clarity, the input area (200) will hereinafter be referred to as the "touch screen panel (200)." FIG. 4 is a structural diagram illustrating an embodiment of the signal processing apparatus (10) applied to a TSP.

Figure 4:
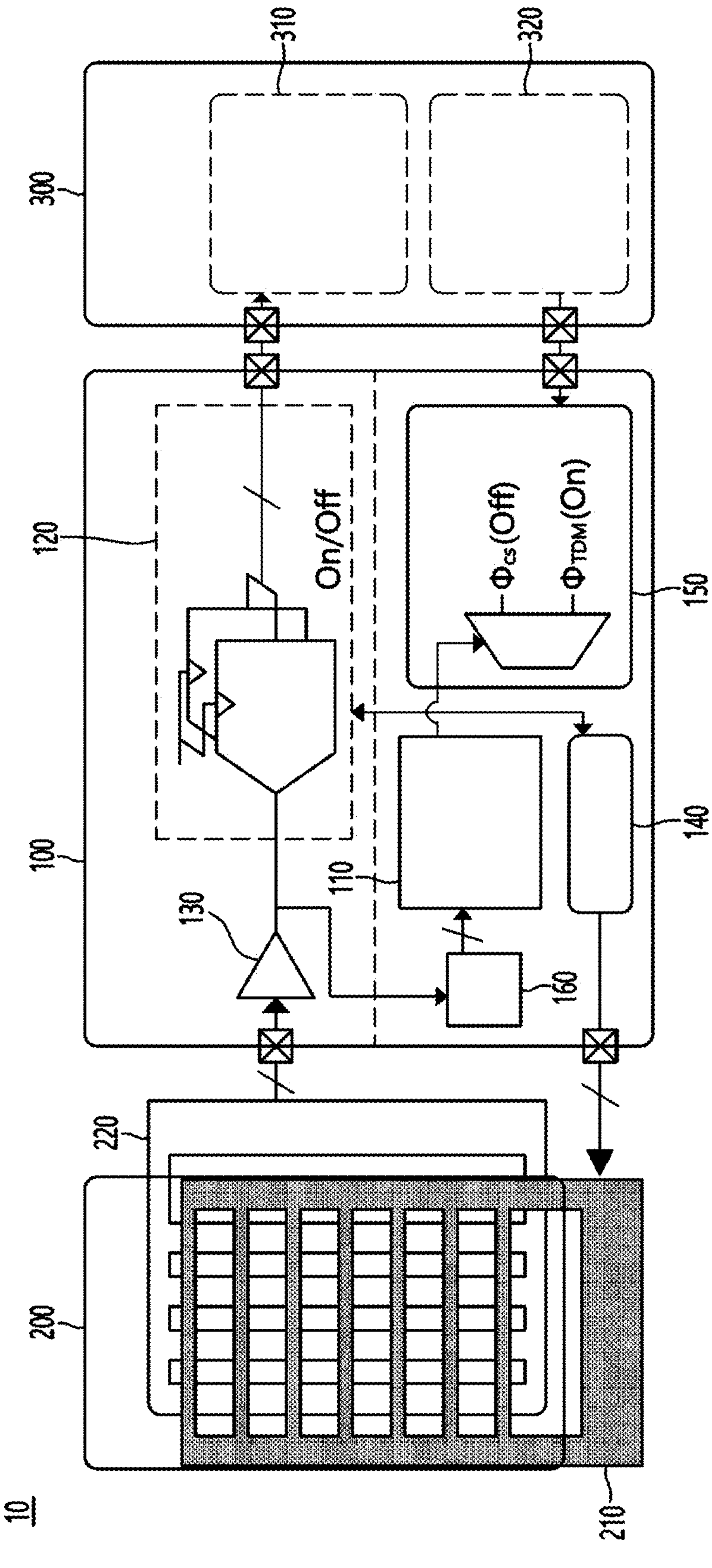
FIG. 4 is a structural diagram illustrating an embodiment of a signal processing device applied to a touch screen panel (TSP).

Referring to FIG. 4, touch recognition on the touch screen panel (200) may proceed through the following series of steps. First, using compressed sensing, the event detector (110) detects touch activity and identifies the event area. Next, based on time division multiplexed sensing, the signal converter (120) reads the event area, and the difference in capacitance resulting from an actual touch at a specific coordinate is converted into a digital signal and output. Subsequently, the signal output from the signal converter (120) is transmitted to a digital processor (300). The digital processor (300) includes a signal processing and analysis unit (310) and an AFE controller (320), through which the signal is reconstructed and the precise coordinates and touch information of the valid touch are analyzed. A detailed explanation of the operation of the digital processor (300) is omitted here, as it is based on well-known concepts.

Referring to FIG. 4, drive channels (210) and sensor channels (220) may be arranged orthogonally, intersecting each other on the touch screen panel (200). The readout IC (100) may include an event detector (110), a signal converter (120), an amplifier (130), a driver (140), a multiplexer (150), and a quantizer (160).

As an example embodiment, and referring to FIG. 4, the sensor channels (220) are connected to both the event detector (110) and the signal converter (120), and an amplifier (130) may be further interposed between them. In addition, a quantizer (160) may be connected between the output terminal of the amplifier (130) and the input terminal of the event detector (110). The event detector (110) may have its output connected to the multiplexer (150) and may control the output of the multiplexer (150). The output of the multiplexer (150) may be connected to the driver (140), and the output of the driver (140) may be connected to the drive channels (210), allowing the driving signal selectively output by the multiplexer (150) to be applied to the drive channels (210). A more detailed embodiment of the signal processing operation based on the interconnections between components in this embodiment will be described later.

According to one embodiment, the drive channels (210) may be arranged longitudinally at predetermined intervals to form rows of the touch screen panel (200).

According to one embodiment, the sensor channels (220) may be arranged laterally at predetermined intervals to form columns of the touch screen panel (200). Each intersection point of the sensor channels (220) and the drive channels (210) may be identified as a unique coordinate on the touch screen panel (200). The sensor channels (220) detect capacitance variations at each coordinate caused by touch, and these variations are transmitted to the readout IC (100).

According to one embodiment, the readout IC (100) may include a multiplexer (150) as part of control logic that selectively outputs a first driving signal and a second driving signal. The multiplexer (150) is preconfigured to output the first driving signal during standby, and when an event area is detected, it may be controlled by the event detector (110) to output the second driving signal.

According to one embodiment, the readout IC (100) may include a driver (140) connected to the multiplexer (150) and configured to apply the driving signal output from the multiplexer (150) to the drive channels (210). That is, the voltage of the first driving signal is applied to the drive channels (210) by the driver (140), and upon detection of the event area, the voltage is immediately switched to the second driving signal and applied to the drive channels (210).

According to one embodiment, the readout IC (100) may include an amplifier (130). The capacitance signals modulated by the first and second driving signals received from the sensor channels (220) are amplified by the amplifier (130) and then delivered to the event detector (110) and the signal converter (120), respectively.

According to one embodiment, the first driving signal may be randomly implemented based on a compressed sensing matrix ($\Phi_{CS}$). For example, the matrix ($\Phi_{CS}$) may be probabilistically generated as a dense random matrix whose elements follow a Gaussian or Bernoulli distribution.

According to one embodiment, the system specifications of the touch screen panel (200) may include a predefined number k of simultaneous inputs that can be registered by a single touch. In this context, the matrix ($\Phi_k$), which implements the first driving signal, may be determined according to the number k of multiple inputs. That is, unlike the conventional compressed sensing matrix ($\Phi_{CS}$) composed of arbitrary random elements, the matrix ($\Phi_k$) for detecting touch activity and identifying event areas is preferably implemented as a deterministic matrix.

Specifically, since the matrix ($\Phi_k$) is based on compressed sensing, it may be implemented as a rectangular matrix of size m×n (where m<n). Accordingly, in the case of a single touch, sparse signal detection may be performed for multiple rows of the touch screen panel (200) using the first driving signal. For design advantages, it is desirable that the matrix ($\Phi_k$) be configured to satisfy the following equation.

$$n = m + \frac{m}{k} \qquad \text{[Equation 4]}$$

At this point, the number of rows m is an integer multiple of the number of simultaneous inputs k.

Under this condition, the matrix ($\Phi_k$) may be composed of a first region—consisting of column vectors $e_i$—used for identifying the sensor channels (220), and a second region—consisting of column vectors $a_{i,k}$—used for detecting sparse signals in compressed sensing (i.e., event detection). This structure may satisfy the following equation:

$$\Phi_k = \left[\begin{array}{cccc|cccc} | & | & & | & | & | & & | \\ e_1 & e_2 & \cdots & e_m & a_{1,k} & a_{k+1,k} & \cdots & a_{m-k+1,k} \\ | & | & & | & | & | & & | \end{array}\right] \qquad \text{[Equation 5]}$$

Here, the column vectors in the first region ($e_i \in \mathbb{Z}^m$) may be configured similarly to time division multiplexed sensing, where the i-th element is 1 and all other elements are 0. Meanwhile, the column vectors in the second region ($a_{i,k} \in \mathbb{Z}^m$) may be configured such that the i-th to (i+k)-th elements are −1, and all other elements are 0. For example, when k=2, the matrix ($\Phi_2$) can be expressed as follows:

$$\Phi_2 = \begin{bmatrix} 1 & 0 & 0 & \ldots & 0 & -1 & 0 & \ldots & 0 \\ 0 & 1 & 0 & \ldots & 0 & -1 & 0 & \ldots & 0 \\ 0 & 0 & 1 & \ldots & 0 & 0 & -1 & \ldots & 0 \\ \vdots & \vdots & \vdots & \ddots & \vdots & \vdots & \vdots & \ddots & \vdots \\ 0 & 0 & 0 & \ldots & 1 & 0 & 0 & \ldots & -1 \end{bmatrix} \qquad \text{[Equation 6]}$$

According to Equation (6), the matrix ($\Phi_k$) may be designed using ternary components of −1, 0, and 1, such that the column vectors ($e_i$) are linearly independent based on the number of multiple inputs k. With this configuration, the event detector (110) can detect all sparse signals corresponding to multiple touch inputs simply by determining whether the measured value of the capacitance change resulting from the first driving signal is zero. It should be noted that this determination of “zero” assumes an ideal condition in which circuit noise is absent. In practical situations where noise is present, the system may instead monitor whether the measured value is approximately zero—that is, whether it is within a predefined threshold from zero.

Furthermore, since the sparse signals representing touch events are positive values, it is possible to identify the sensor channels (220) activated by an event based on the sign and magnitude of the measured values derived from the matrix ($\Phi_k$). As described above, because m<n, when k simultaneous inputs occur, the number of readout operations performed by the event detector (110) is reduced compared to time division multiplexed sensing. For example, assuming that Equation (4) is satisfied, m samples can be read from n sensors. That is, when the first driving signal based on the matrix ($\Phi_k$) is applied to the drive channels (210), and k simultaneous inputs occur, the sensing ratio per unit time for the sensor channels (220) can be expressed as $$\frac{k}{k+1}.$$

Accordingly, the event detector (110) detects touch events at a faster speed, thereby contributing to improved energy efficiency. According to one embodiment, using the structure of Equation (5), the matrix implementing the first driving signal may be determined as a matrix ($\Phi_{k,l} \in \mathbb{Z}^{m \times nl}$) configured to simultaneously determine the presence or absence of touch activity in at least two or more columns of the sensor channels (220) arranged in the touch screen panel (200). This matrix may be generated by repeating each column vector of the original matrix ($\Phi_k$) l times. As a result, a block of l column vectors can be regarded as a single virtual column vector, thereby achieving a better detection ratio compared to conventional compressed sensing.

More specifically, l is a parameter determined based on the number of simultaneous inputs (k) and the total number of sensor channels (220), denoted by N. Here, both k and N are predefined system specifications, and under the condition of Equation (4), it is desirable that they satisfy the following equation:

$$N < nl \quad \text{[Equation 7]}$$

When the condition in Equation (7) is satisfied, each column vector of the matrix ($\Phi_{k,l}$) may be repeated ((l−1)) times instead of l, in order to construct a matrix of size m×N. In such a case, a block consisting of l or ((l−1)) sensor channels (220) may be treated as a single virtual sensor channel, and the determination of which block has been activated can be made in the same manner as with the original matrix ($\Phi_k$). That is, using only the m measurement results detected according to the first driving signal, the event detector (110) can determine the presence of touch activity across N sensor channels, even when k simultaneous inputs have occurred, as long as the following condition is satisfied:

$$N = n \times l = l\left(m + \frac{m}{k}\right) \quad \text{[Equation 8]}$$

Accordingly, when the first driving signal based on the matrix ($\Phi_{k,l}$) is applied to the drive channels (210), and k simultaneous inputs occur, the sensing ratio per unit time for the sensor channels (220) can be expressed as:

$$\frac{k}{l(k+1)}$$

According to one embodiment, the event detector (110) does not perform complex computations for signal reconstruction. Instead, it detects the event area where touch is activated using only relatively simple operations such as comparisons and additions. Therefore, even though sparse signals are detected using a compressed sensing-based approach, the substantial power typically consumed during the demodulation process is not required, allowing the overall energy consumption to be minimized.

For example, it is possible to detect the event area simply by activating multiple sensor channels (220) simultaneously and comparing the resulting output against a predefined threshold. However, although the number of elements requiring detection is relatively small, the sensor outputs are accompanied by significant direct current (DC) components. Consequently, when multiple sensor columns are sensed at the same time, the accumulated DC components may exceed the operational range of the amplifier (130) and the signal converter (120). As a preventive measure, in one embodiment, the matrix of the first driving signal—such as ($\Phi_k$) and ($\Phi_{k,l}$)—can be designed such that the sum of the components in each row vector is zero, allowing the output DC components to cancel each other out.

Specifically, based on the structural characteristics of Equation (5), the event detector (110) may execute an event area detection algorithm using the measurement values of capacitance signals modulated by the first driving signal. As described above, this algorithm can be applied identically to both matrix ($\Phi_k$) and matrix ($\Phi_{k,l}$), which implement the first driving signal. In the following description, the embodiment will be explained using ($\Phi_{k,l}$) as the example.

In this context, the event detector (110) may include, or be connected to, a quantizer (160) that quantizes the measured capacitance variation values—modulated by the matrix ($\Phi_{k,l}$)—into 2-bit representations. For example, in a scenario where noise (n) is considered, the measured voltage values ($\Phi_{k,l}$x+n) expressed as are compared against a predefined threshold value (Vth) that serves as a criterion for touch activity. Based on this comparison, the signal can be quantized into four levels using the following expression: It should be noted that this is only an illustrative example, and the threshold value (Vth) may be configured as one or more levels, depending on the implementation.

$$y = Q(\Phi_{k,l}x + n) \in \mathbb{R}^m \quad \text{[Equation 9]}$$

Level:

$$(-\infty, -Vth), \left(-Vth, -\frac{Vth}{2}\right), \left(-\frac{Vth}{2}, Vth\right), (Vth, \infty)$$

The event detector (110) may determine whether each column, in which the respective sensor channels (220) are located, is activated based on an algorithm using the quantized measurement values (y), and may detect an event region by aggregating the results. Here, the touch activation state may be output as an indicator ($w \in \mathbb{R}^N$). For example, if the value of the i-th indicator ($w_i$) is 1, the region of the touch screen panel (200) corresponding to the i-th column may be determined to be included in the event region, and if the value is 0, it may be determined to be inactive.

Specifically, in a first step, the event detector (110) may search the quantized measurement values (y) for negative samples having an absolute value greater than −Vth. The event detector (110) may determine that the sensor channels (220) corresponding to the positions of the identified samples are activated, and may output an indicator w as 1 for those positions. That is, the columns in which the corresponding sensor channels (220) are arranged may be identified as being included in an event region in which a sparse signal is detected. In a second step, the event detector (110) may examine the negative samples identified in the first step to identify k consecutive samples, where k denotes the number of multiple touches, and may check whether the corresponding measurement values (y) are close to zero. For example, among the k consecutive negative samples identified in the first step, the event detector (110) may search for positions in which the measurement value (y) is greater than $$-\frac{Vth}{2}.$$

Through this process, additional regions in which a touch is activated may be identified as part of the event region. In a third step, when no negative sample is detected in the first step, the event detector (110) may determine that $$\frac{m}{k}$$

number of sensor channels within the range of [m+1, n] are inactive. Subsequently, the event detector (110) may search the quantized measurement values (y) for positive samples having a value greater than Vth, and may identify the columns of the touch screen panel (200) corresponding to the positions of such positive samples as belonging to the event region, and output the indicator (w) as 1 for those positions.

As a result of the above-described algorithm, all of the activated sensor channels (220) based on the first driving signal may be aggregated, and an event region within the touch screen panel (200) where a touch is detected or determined to be activated may be identified. When an event region is detected, the event detector (110) may control the multiplexer (150) to switch to the second driving signal, and the driver (140) may apply the second driving signal, output by the multiplexer (150), to the drive channel (210).

As described in the foregoing embodiment, the operation of the event detector (110) in response to the first driving signal may be continuously performed under a preconfigured threshold of low power. In this process, the signal converter (120) remains in an OFF state and does not operate, and it transitions to an ON state and begins operation only when the event region is detected and the signal is switched to the second driving signal. Accordingly, the energy consumption required for the analog-to-digital converter (ADC) is efficiently reduced.

According to an embodiment, time-division multiplexed sensing may be performed only within the event region, rather than across the entire area of the touch screen panel (200), for detecting valid touch coordinates. That is, when the second driving signal is applied to the drive channel (210), the signal converter (120) may receive the sensing results only from sensor channels within the event region among the sensor channels (220) arranged on the touch screen panel (200).

Thus, since the signal restoration process is not required during the time-division multiplexed sensing, computational efficiency may be improved, while also addressing the issues of slow processing speed and unnecessary power consumption associated with conventional time-division multiplexed sensing.

Ultimately, the signal converter (120) may measure the capacitance signal modulated by the second driving signal and amplified by the amplifier (130), convert the measured signal into a digital signal, and output the result. The output digital signal may be transmitted to the digital processor (300) and extracted as touch information.

Hereinafter, experimental data supporting the effects of the present invention will be described with reference to FIGS. 5A through 6B. FIGS. 5A to 6B illustrate experimental data that supports the effect of one embodiment of the present invention.

Figure 5A:
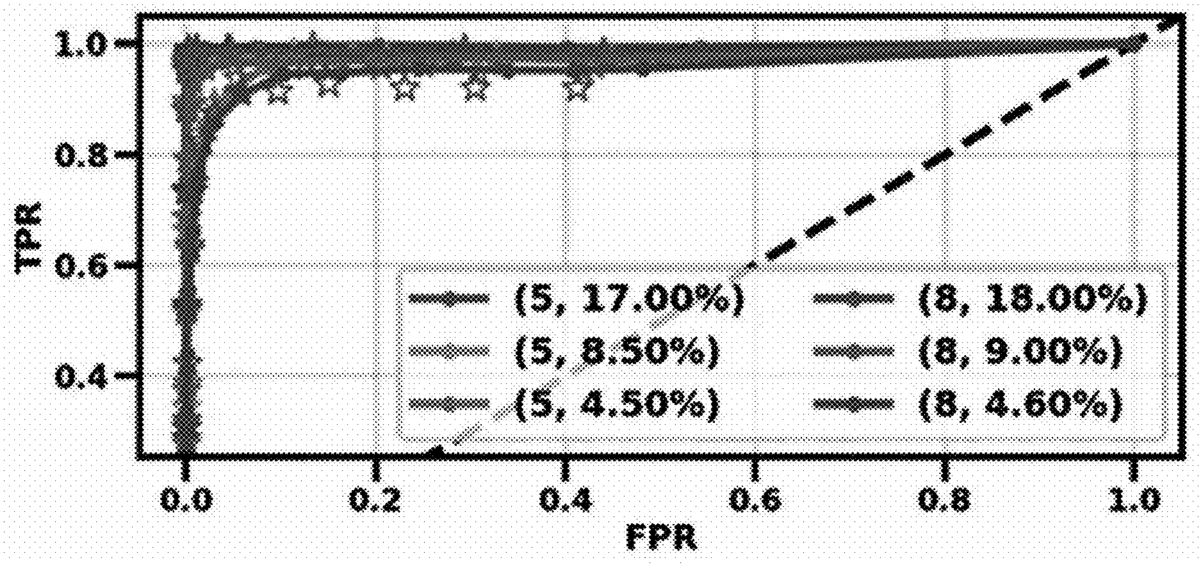
FIGS. 5A, 5B, 5C, 6A, and 6B are data supporting the effects according to one embodiment of the present invention.
Figure 5B:
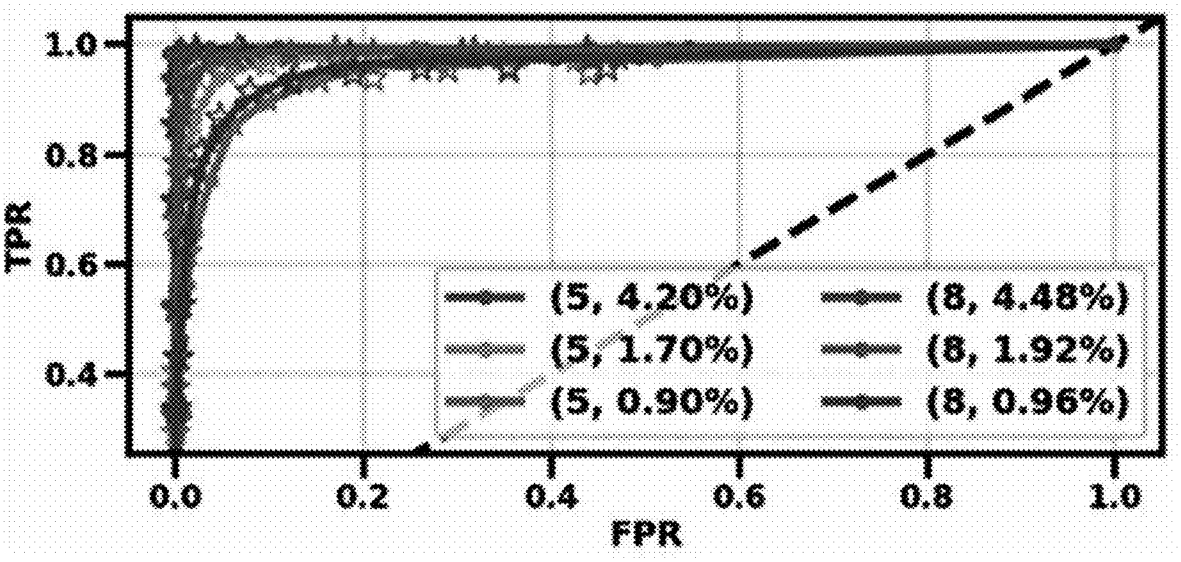
Figure 5C:
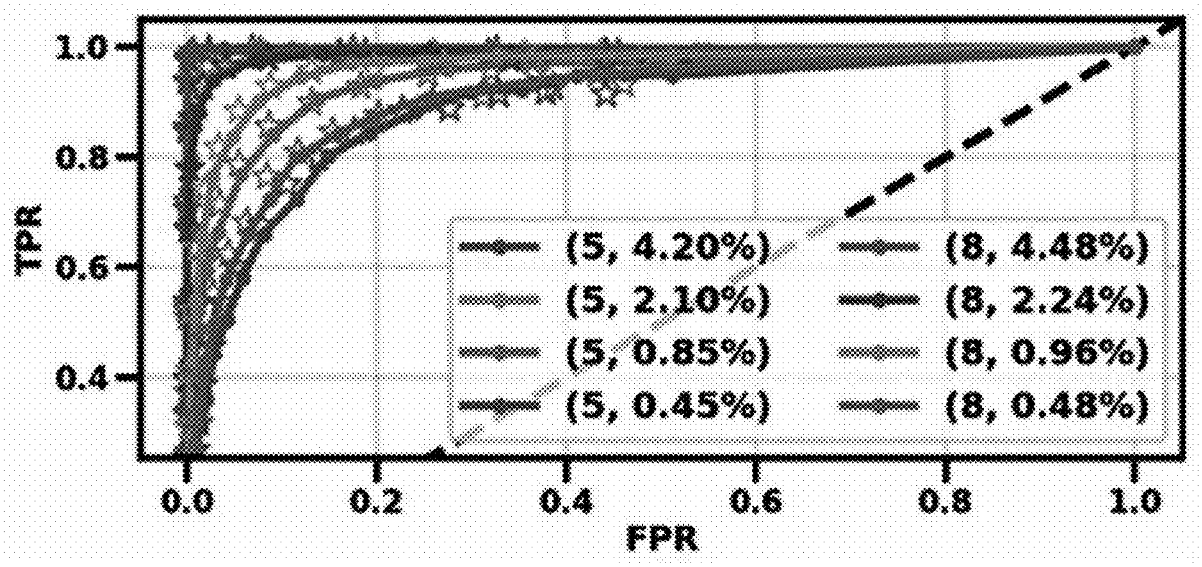

FIGS. 5A through 5C are graphs showing the performance of sensing precision (True Positive Rate, TPR) and recall (False Positive Rate, FPR) when signal processing is performed in conjunction with the event detector (110) under various environments. The number of sensors used is 1,000 in FIG. 5A, 5,000 in FIG. 5B, and 10,000 in FIG. 5C. For each case, the number of multiple inputs is set to 5 and 8, and the sampling ratio is varied. From these graphs, it can be observed that a lower sampling ratio enables the compression sensing of multiple columns, leading to energy savings. Moreover, FIGS. 5A through 5C represent results obtained under a signal-to-noise ratio (SNR) of 25 dB, which is poorer than the typical 40 dB SNR of general touch screen panels, thereby suggesting that sensing combined with the event detector (110) is sufficiently robust against noise.

Figure 6A:
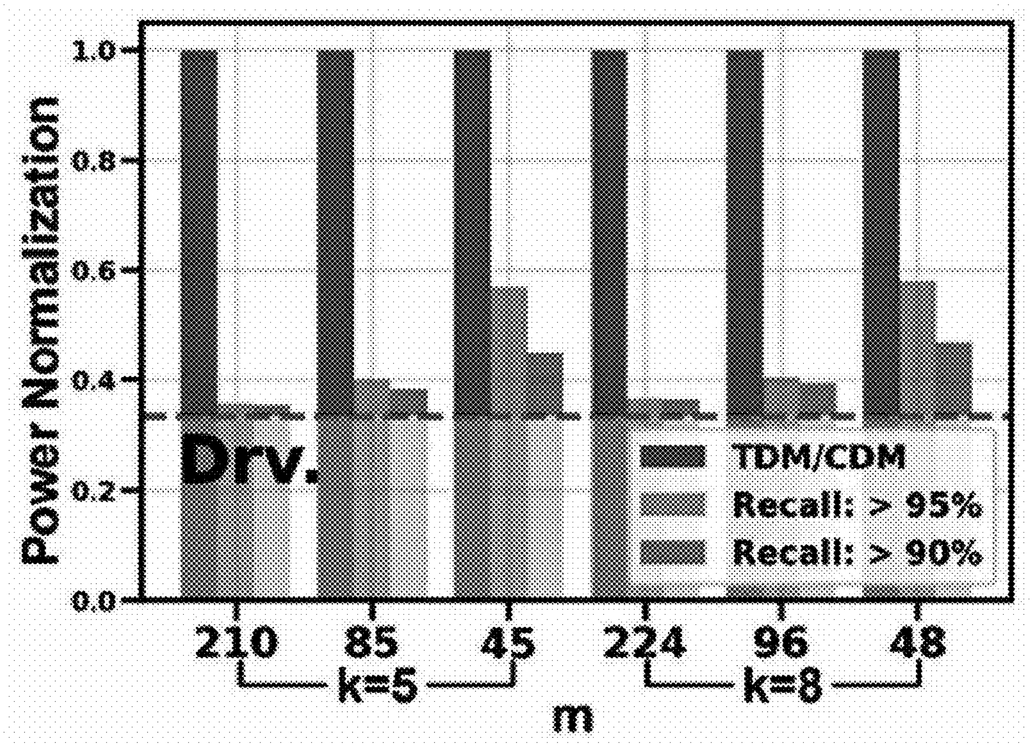
Figure 6B:
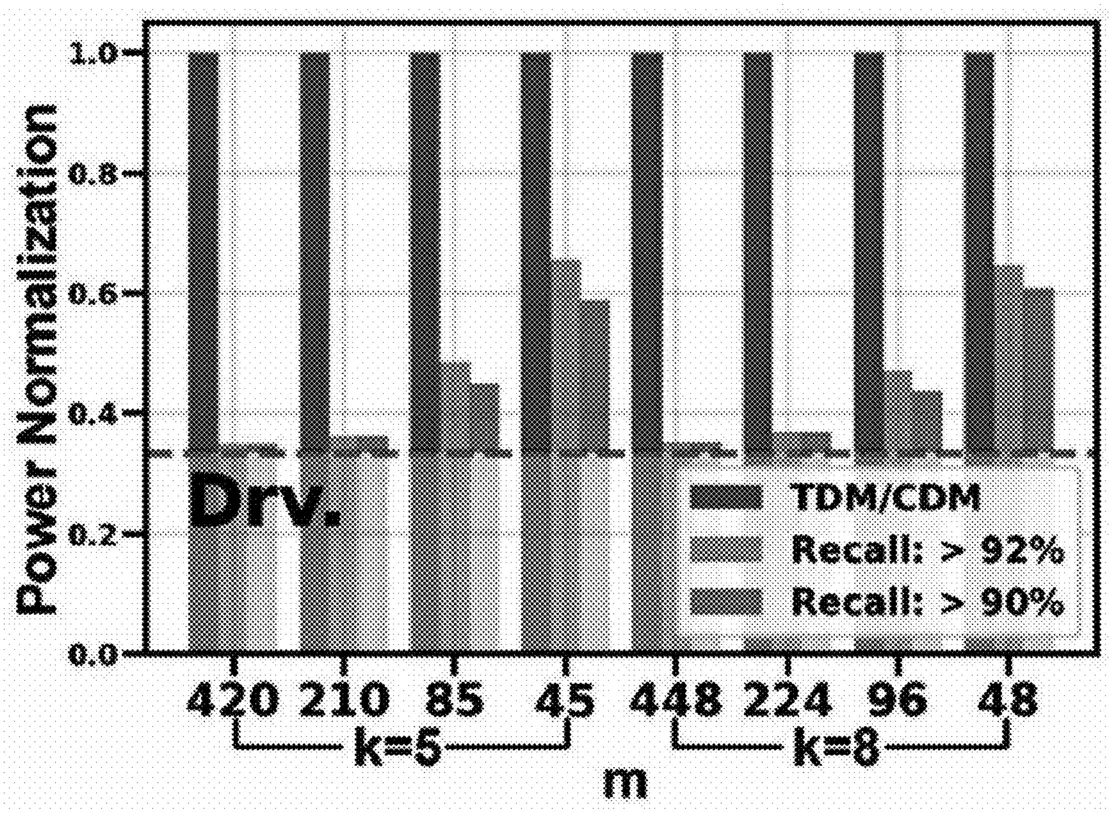

FIGS. 6A and 6B are graphs comparing the power consumption of the conventional TDM and CDM methods with that of the present invention. The number of sensors used is 5,000 in FIG. 6A and 10,000 in FIG. 6B. The number of multiple inputs (k) is set to 5 and 8, respectively, and the number of columns simultaneously detected (m) is varied to measure the power consumption. In the case of the present invention, the configuration of the event detector (110) is additionally applied to the conventional TDM-based structure. The event detector (110) operates continuously; however, in the absence of a touch event, the amplifier and ADC are implemented in the OFF state. From the results, it can be confirmed that the signal processing apparatus (10) according to the present invention maintains a recall performance of over 90% while achieving up to 42 times more power savings compared to the conventional methods.

Figure 7:
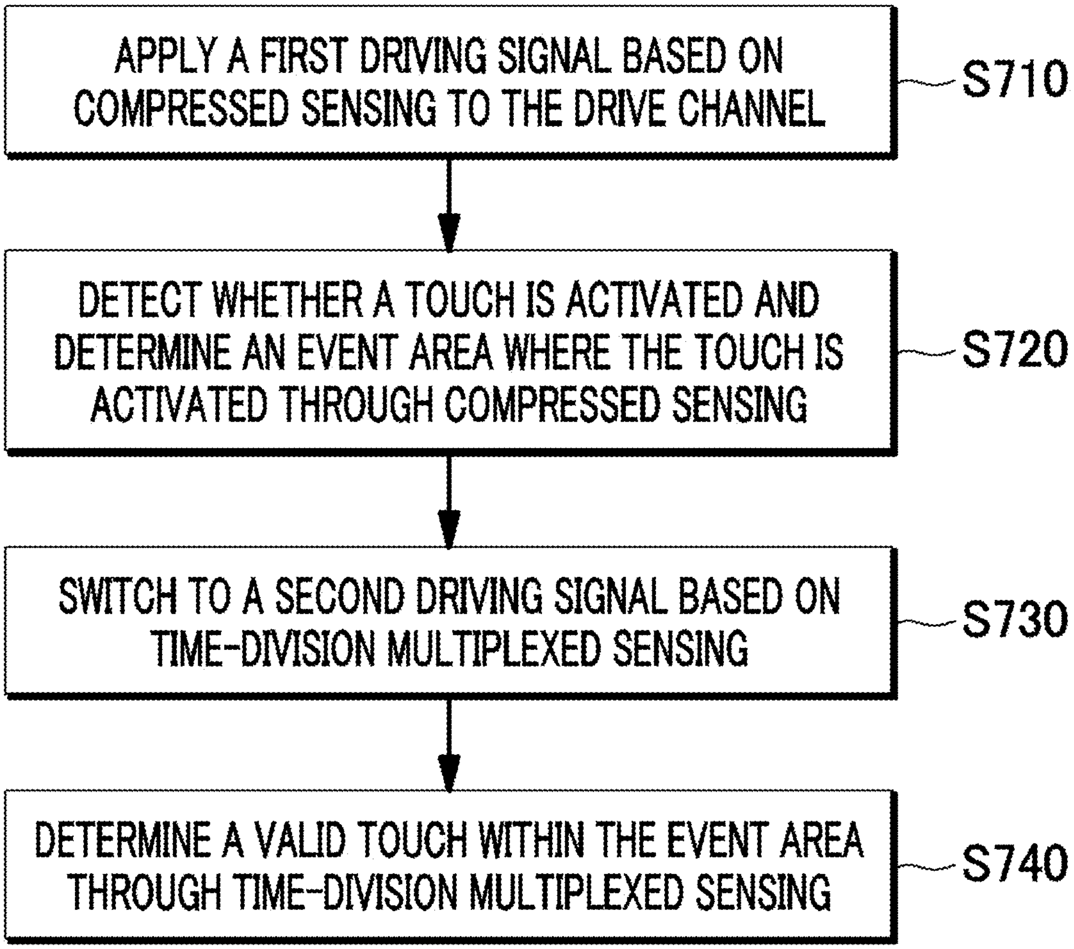
FIG. 7 is a flowchart illustrating the operation of a signal processing method for a touch input device according to one embodiment of the present invention.

Hereinafter, the process of the signal processing apparatus (10) of the present invention will be summarized with reference to FIG. 7. FIG. 7 is a flowchart illustrating a signal processing method of a touch input device according to an embodiment of the present invention, wherein redundant descriptions of the embodiment will be omitted as they have been provided above.

According to step S710, the apparatus (10) applies a first driving signal based on compressive sensing to a plurality of drive channels arranged in an input region for touch input. Meanwhile, a plurality of sensor channels is disposed to intersect the drive channels within the input region.

In one embodiment, the apparatus (10) may determine a matrix for implementing the first driving signal based on a predetermined number of multiple inputs in the input region.

In another embodiment, the apparatus (10) may configure the matrix for implementing the first driving signal using ternary code components of −1, 0, and 1, and determine the matrix such that each column vector is arranged independently based on the number of multiple inputs and the sum of components in each row vector is zero.

In yet another embodiment, the matrix for implementing the first driving signal may be configured such that the presence or absence of touch activation in at least two columns of the input region is detected simultaneously.

In step S720, the apparatus (10) detects changes in capacitance in the input region according to the first driving signal through the sensor channels and, based on the detection result, identifies an event region interpreted as a touch activation within the input region.

In one embodiment, the apparatus (10) compares the measured capacitance signal modulated by the first driving signal with at least one predetermined threshold for touch activation and detects the event region based on the level of the quantized measurement result.

In another embodiment, steps S710 and S720 may be continuously performed with power consumption below a predetermined threshold.

In step S730, the apparatus (10) switches the driving signal applied to the drive channels from the first driving signal to a second driving signal based on time-division multiplexing (TDM) sensing.

In one embodiment, a multiplexer that previously output the first driving signal may output the second driving signal upon detection of the event region, and the second driving signal may be applied via a driver connected to the multiplexer.

In step S740, the apparatus (10) detects changes in capacitance according to the second driving signal through the sensor channels. Based on the detection result, the apparatus (10) measures the capacitance signal modulated by the second driving signal corresponding to coordinates interpreted as valid touches in the event region, converts the signal into a digital signal, and outputs the result.

In one embodiment, when the second driving signal is applied to the drive channels, the apparatus (10) collects detection results only from sensor channels corresponding to the event region among those arranged in the input region.

In another embodiment, the signal conversion unit of the apparatus (10) performing step S740 may be inactive during steps S710 and S720 and configured to operate only under the condition that step S730 is executed.

Although the method and system of the present invention have been described with reference to specific embodiments, parts or all of the configurations or operations thereof may be implemented using a general-purpose computer system with standard hardware architecture.

The foregoing description of the present invention is provided for illustrative purposes only, and it will be understood by those skilled in the art that various modifications and alterations can be made without departing from the scope or spirit of the invention. Therefore, the embodiments described above are illustrative in all respects and not restrictive. For example, each component described as a single module may be distributed and implemented, and likewise, components described as distributed may be combined and implemented in a unified form.

The scope of the present invention should be defined not by the foregoing detailed description but by the claims appended hereto, and all modifications or equivalents derived from the meaning and scope of the claims should be construed as falling within the scope of the invention.

DESCRIPTION OF REFERENCE NUMERALS

10: Signal processing apparatus
100: Readout IC
110: Event detector
120: Signal Converter
130: Amplifier
140: Driver
150: Multiplexer
160: Quantizer
200: Input area
210: Drive Channel
220: Sensor Channel
300: Digital Processor
310: Signal Processing and Analysis Unit
320: AFE Controller

What is claimed is:

1. A signal processing apparatus for a touch input device, comprising:
a plurality of drive channels arranged in an input area for a touch function;
a plurality of sensor channels intersecting the drive channel and configured to detect a change in capacitance in the input area in response to a driving signal applied to the drive channel; and
a readout integrated circuit (Readout IC) configured to apply the driving signal to the drive channel and receive detection results from the sensor channels,
wherein the Readout IC comprises:
an event detector configured to detect an event region determined as a touch activation within the input area based on detection results of the sensor channels in response to a first driving signal based on compressed sensing applied to the drive channel,
and, when the event region is detected, to cause a second driving signal based on time division multiplexed sensing to be applied to the drive channel; and
a signal converter configured to measure capacitance signals modulated by the second driving signal in correspondence with coordinates identified as valid touches within the event region, convert the signals into digital signals, and output the digital signals.

2. The signal processing apparatus of claim 1,
wherein the event detector operates continuously with power consumption below a predetermined threshold.

3. The signal processing apparatus of claim 1,
wherein the signal converter is configured not to operate while the first driving signal is applied to the drive channel, and to operate only under a condition in which the second driving signal is applied.

4. The signal processing apparatus of claim 1,
wherein the signal converter is configured to receive only detection results from the sensor channels corresponding to the event region among the sensor channels arranged in the input area, when the second driving signal is applied to the drive channel.

5. The signal processing apparatus of claim 1,
wherein the readout IC comprises:
a multiplexer configured to output the first driving signal as a default, and to output the second driving signal under control of the event detector; and
a driver configured to apply the driving signal output from the multiplexer to the drive channel.

6. The signal processing apparatus of claim 1,
wherein a matrix implementing the first driving signal is determined based on a predetermined number of multiple inputs in the input area.

7. The signal processing apparatus of claim 6,
wherein the matrix is composed of ternary code elements of −1, 0, and 1,
and is configured such that column vectors are arranged independently based on the number of multiple inputs, and the sum of components in each row vector is zero.

8. The signal processing apparatus of claim 1,
wherein the matrix implementing the first driving signal is configured to simultaneously determine the touch activation status in at least two columns among the columns in the input area in which the sensor channels are arranged.

9. The signal processing apparatus of claim 1,
wherein the event detector compares measured capacitance signals modulated by the first driving signal with at least one preset threshold for determining touch activation,
and detects the event region based on the level of quantized measurement values obtained as a result of the comparison.

10. A signal processing method of a touch input device, comprising:
applying a first driving signal based on compressed sensing to a plurality of drive channels arranged in an input area for touch functionality;
detecting a change in capacitance in the input area based on the first driving signal through a plurality of sensor channels arranged to intersect the drive channels, and detecting an event region interpreted as a touch activation within the input area based on a detection result;

applying a second driving signal based on time division multiplexed sensing to the drive channels according to the detection of the event region; and detecting a change in capacitance based on the second driving signal through the sensor channels, and measuring a capacitance signal modulated by the second driving signal and converting it into a digital signal in correspondence with a coordinate interpreted as a valid touch in the event region, and outputting the digital signal.

11. The signal processing method of claim 10, wherein the applying of the first driving signal and the detecting of the event region are continuously performed while consuming power below a preset threshold.

12. The signal processing method of claim 10, wherein the converting and outputting into a digital signal is performed by a signal converter that converts an analog signal into a digital signal, and the signal converter is configured to operate under a condition in which the second driving signal is applied by switching from the first driving signal.

13. The signal processing method of claim 10, wherein the converting and outputting into the digital signal includes collecting detection results only from the sensor channels corresponding to the event region among the sensor channels arranged in the input area when the second driving signal is applied to the drive channels.

14. The signal processing method of claim 10, wherein the applying of the second driving signal includes:

outputting the second driving signal by a multiplexer that was outputting the first driving signal under a condition where the event region is detected, and applying the second driving signal to the drive channels via a driver connected to the multiplexer.

15. The signal processing method of claim 10, wherein the applying of the first driving signal includes determining a matrix implementing the first driving signal based on a preset number of multiple inputs in the input area.

16. The signal processing method of claim 15, wherein the matrix is composed of ternary code components of −1, 0, and 1, and the column vectors are arranged independently based on the number of multiple inputs, and the sum of the elements of each row vector is set to be zero.

17. The signal processing method of claim 10, wherein the applying of the first driving signal includes determining the matrix implementing the first driving signal to simultaneously detect touch activation states in at least two columns among the columns of the input area where the sensor channels are arranged.

18. The signal processing method of claim 10, wherein the detecting of the event region includes comparing a measured value of a capacitance signal modulated by the first driving signal with at least one preset threshold as a criterion for touch activation, and detecting the event region based on a level of a quantized measurement value resulting from the comparison.

* * * * *